(12) United States Patent
Kurokawa et al.

(10) Patent No.: US 9,102,809 B2
(45) Date of Patent: Aug. 11, 2015

(54) METHOD FOR PRODUCING FLAME-RETARDANT THERMOPLASTIC ELASTOMER COMPOSITION

(71) Applicant: Sumitomo Chemical Company, Limited, Chuo-ku, Tokyo (JP)

(72) Inventors: Ryosuke Kurokawa, Ichihara (JP); Nobuhiro Natsuyama, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 13/954,127

(22) Filed: Jul. 30, 2013

(65) Prior Publication Data

US 2014/0039108 A1    Feb. 6, 2014

(30) Foreign Application Priority Data

Aug. 1, 2012 (JP) ................. 2012-170898

(51) Int. Cl.
| | | |
|---|---|---|
| *C08K 3/22* | (2006.01) | |
| *C08K 3/06* | (2006.01) | |
| *C08K 5/053* | (2006.01) | |
| *C08K 5/06* | (2006.01) | |
| *C08L 23/16* | (2006.01) | |

(52) U.S. Cl.
CPC . *C08K 3/22* (2013.01); *C08K 5/053* (2013.01); *C08K 5/06* (2013.01); *C08L 23/16* (2013.01)

(58) Field of Classification Search
CPC ............. C08K 3/22; C08K 5/06; C08K 5/053
USPC ........................ 524/377, 432, 387
See application file for complete search history.

(56) References Cited

U.S. PATENT DOCUMENTS

| 2003/0059637 A1 | 3/2003 | Imai et al. |
| 2011/0144244 A1 * | 6/2011 | Lee ................................. 524/84 |

FOREIGN PATENT DOCUMENTS

| JP | 2003-147133 A | 5/2003 |
| JP | 2005-060603 A | 3/2005 |
| JP | 2008-063458 A | 3/2008 |
| JP | 2010-222402 A | 10/2010 |

* cited by examiner

*Primary Examiner* — James J Seidleck
*Assistant Examiner* — Deve E Valdez
(74) *Attorney, Agent, or Firm* — Panitch Schwarze Belisario & Nadel LLP

(57) ABSTRACT

A method is provided for producing a flame retardant thermoplastic elastomer composition, wherein the method includes (1) a step of preparing a thermoplastic elastomer composition by dynamically vulcanizing a thermoplastic elastomer composition precursor containing (A) an ethylene-α-olefin-based copolymer rubber, (B) a propylene-based polymer and (C) a mineral oil-based softening agent in the presence of (D) a crosslinking agent, and (2) a step of kneading the thermoplastic elastomer composition, (E) a halogen-free flame retardant, (F) a zinc oxide, and optionally (G) a polyhydric compound.

4 Claims, No Drawings

METHOD FOR PRODUCING FLAME-RETARDANT THERMOPLASTIC ELASTOMER COMPOSITION

TECHNICAL FIELD

The present invention relates to methods for producing flame-retardant thermoplastic elastomer compositions.

BACKGROUND ART

Olefin-based thermoplastic elastomer compositions have been used widely for automotive interior parts, automotive exterior parts, electrical machinery parts, household appliance parts, packaging members, agricultural materials, building members, etc. because they are capable of being processed with a common molding machine for thermoplastic resins and being recycled and they are soft (see patent document 1). However, since thermoplastic elastomers are flammable materials, they must be made flame retardant for some applications.

Well known methods for making a synthetic resin flame retardant include methods in which an inorganic phosphorus-based flame retardant such as red phosphorus and phosphorus-containing flame retardants, an organophosphorus flame retardant such as triaryl phosphate compounds, a halogen-containing flame retardant, or a metal hydroxide flame retardant is added, and, optionally, a flame retarding aid such as antimony oxide, a melamine compound is further added into a synthetic resin. (See patent documents 2 to 4.)

PRIOR ART DOCUMENTS

Patent Documents

Patent Document 1: JP-A-2003-147133
Patent Document 2: JP-A-2010-222402
Patent Document 3: JP-A-2005-60603
Patent Document 4: JP-A-2008-63458

SUMMARY OF THE INVENTION

Problems to be Solved by the Invention

In some occasions, a mineral oil-based softening agent is incorporated into a thermoplastic elastomer composition in order to improve softness or the like. In order to fully make a thermoplastic elastomer composition flame retardant with incorporation of a mineral oil-based softening agent, it was necessary to incorporate a large amount of the flame retardant into the thermoplastic elastomer composition. However, the incorporation of a large amount of the flame retardant into the thermoplastic elastomer composition may cause deterioration of the composition in softness, flowability, molding processability, and mechanical performance, and it was difficult to provide a thermoplastic elastomer composition superior in flame retardancy while maintaining these performances.

The object of the present invention is to provide a thermoplastic elastomer composition which is superior in flame retardancy while maintaining softness, flowability, molding processability, and mechanical performance.

Means for Solving the Problems

One embodiment of the present invention is a method for producing a flame retardant thermoplastic elastomer composition, wherein the method comprises a step of preparing a thermoplastic elastomer composition by dynamically vulcanizing a thermoplastic elastomer composition precursor comprising 10 to 75% by weight of (A) an ethylene-α-olefin-based copolymer rubber, 10 to 50% by weight of (B) a propylene-based polymer and 1 to 60% by weight of (C) a mineral oil-based softening agent in the presence of 0.001 to 5 parts by weight of (D) a crosslinking agent per 100 parts by weight of the thermoplastic elastomer composition precursor, where the total amount of the ethylene-α-olefin-based copolymer rubber (A), the propylene-based polymer (B) and the mineral oil-based softening agent (C) is taken as 100% by weight, and a step of kneading the thermoplastic elastomer composition, (E) a halogen-free flame retardant and (F) a zinc oxide where the combined amount of the halogen-free flame retardant (E) and the zinc oxide (F) is 30 to 70 parts by weight per 100 parts by weight of the thermoplastic elastomer composition precursor.

Another embodiment of the present invention is a method for producing a flame retardant thermoplastic elastomer composition, wherein the method comprises a step of preparing a thermoplastic elastomer composition by dynamically vulcanizing a thermoplastic elastomer composition precursor comprising 10 to 75% by weight of (A) an ethylene-α-olefin-based copolymer rubber, 10 to 50% by weight of (B) a propylene-based polymer and 1 to 60% by weight of (C) a mineral oil-based softening agent in the presence of 0.001 to 5 parts by weight of (D) a crosslinking agent per 100 parts by weight of the thermoplastic elastomer composition precursor, where the total amount of the ethylene-α-olefin-based copolymer rubber (A), the propylene-based polymer (B) and the mineral oil-based softening agent (C) is taken as 100% by weight, and a step of kneading the thermoplastic elastomer composition, (E) a halogen-free flame retardant, (F) a zinc oxide and (G) a polyhydric compound where the combined amount of the halogen-free flame retardant (E) and the zinc oxide (F) is 30 to 70 parts by weight and the amount of the polyhydric compound (G) is 0.5 to 10 parts by weight per 100 parts by weight of the thermoplastic elastomer composition precursor.

Effect of the Invention

The present invention provides a thermoplastic elastomer composition which is superior in flame retardancy while maintaining softness, flowability, molding processability, and mechanical performance.

MODE FOR CARRYING OUT THE INVENTION

Ethylene-α-Olefin-Based Copolymer Rubber (A)

The ethylene-α-olefin-based copolymer rubber (A) is sometimes called component (A) in this description. The component (A) is a copolymer having monomer units derived from ethylene (ethylene units) and monomer units derived from an α-olefin having 3 to 10 carbon atoms (units of an α-olefin having 3 to 10 carbon atoms). Examples of the α-olefin having 3 to 10 carbon atoms include propylene, 1-butene, 2-methylpropylene, 1-pentene, 3-methyl-1-butene, 1-hexene, 4-methyl-1-pentene, and 1-octene; one or more monomers out of these olefins are used. Preferred as the α-olefin having 3 to 10 carbon atoms are α-olefins having 3 to 6 carbon atoms, and more preferred are propylene and 1-butene.

The component (A) may have, in addition to ethylene units and units of an α-olefin having 3 to 10 carbon atoms, monomer units derived from other monomers. Examples of such monomers include conjugated dienes having 4 to 8 carbon atoms such as 1,3-butadiene, 2-methyl-1,3-butadiene (isoprene), 1,3-pentadiene, and 2,3-dimethyl-1,3-butadiene; nonconjugated dienes having 5 to 15 carbon atoms such as dicyclopentadiene, 5-ethylidene-2-norbornene, 1,4-hexadiene, 1,5-dicyclooctadiene, 7-methyl-1,6-octadiene, and 5-vinyl-2-norbornene; vinyl ester compounds such as vinyl acetate; unsaturated carboxylic acid esters such as methyl acrylate, ethyl acrylate, butyl acrylate, methyl methacrylate, and ethyl methacrylate; and unsaturated carboxylic acids such as acrylic acid and methacrylic acid. The component (A) may have monomer units derived from one or more monomers. Preferable other monomers include 5-ethylidene-2-norbornene and dicyclopentadiene.

The content of the ethylene units in the component (A) is 35 to 90% by weight, preferably 40 to 80% by weight; the content of the α-olefin units having 3 to 10 carbon atoms is 10 to 65% by weight, preferably 20 to 60% by weight; and the content of monomer units other than the ethylene units and the α-olefin units is 0 to 30% by weight, preferably 0 to 20% by weight, where the overall amount of the monomer units in the ethylene-α-olefin-based copolymer rubber is considered to be 100% by weight.

Examples of the component (A) include ethylene-propylene copolymer rubbers, ethylene-1-butene copolymer rubbers, ethylene-1-hexene copolymer rubbers, ethylene-1-octene copolymer rubbers, ethylene-propylene-1-butene copolymer rubbers, ethylene-propylene-1-hexene copolymer rubbers, ethylene-propylene-1-octene copolymer rubbers, ethylene-propylene-5-ethylidene-2-norbornene copolymer rubbers, ethylene-propylene-dicyclopentadiene copolymer rubbers, ethylene-propylene-1,4-hexadiene copolymer rubbers, and ethylene-propylene-5-vinyl-2-norbornene copolymer rubbers. The component (A) may comprise two or more rubbers. Preferred are ethylene-propylene copolymers or ethylene-propylene-5-ethylidene-2-norbornene copolymers having the content of ethylene units of 40 to 80% by weight, the content of propylene units of 15 to 60% by weight, and the content of 5-ethylidene-2-norbornene units of 0 to 20% by weight.

The Mooney viscosity ($ML_{1+4}100°$ C.) of the component (A) is preferably 5 to 300, more preferably 10 to 200. When the Mooney viscosity is excessively low, mechanical strength may be poor, and when the Mooney viscosity is excessively high, the appearance of a molded article may be damaged. The Mooney viscosity ($ML_{1+4}100°$ C.) is measured in accordance with JIS K6300 (1994). ($ML_{1+4}100°$ C.) has the following meaning:
M: Mooney viscosity,
L: a large rotor was used,
100° C.: measurement temperature,
1+4: a value measured when a rotor was rotated at 2 rpm for 4 minutes after the sample was heated for 1 minute.

The intrinsic viscosity of the component (A) measured in 135° C. tetralin is preferably 0.5 dl/g to 8 dl/g, more preferably 1 dl/g to 6 dl/g. When the intrinsic viscosity is excessively low, mechanical strength may be poor, and when the intrinsic viscosity is excessively high, the appearance of a molded article may be damaged.

An example of a method for producing the component (A) is a method comprising copolymerizing ethylene, an α-olefin, and optionally other monomers by a conventional polymerization technique such as slurry polymerization, solution polymerization, bulk polymerization, and vapor phase polymerization, using a conventional Ziegler-Natta catalyst or a conventional complex-based catalyst such as a metallocene type complex and a non-metallocene type complex.

(Propylene-Based Polymer (B))

The propylene-based polymer (B) is sometimes called component (B) in this description. The component (B) is a propylene homopolymer, a propylene-based random copolymer or a propylene-based block copolymer. The component (B) may include two or more such polymers. When the component (B) contains ethylene units, the content of the ethylene units is less than 35% by weight, where the total amount of all the monomer units in the component (B) is taken as 100% by weight.

Preferred as the above-mentioned propylene-based random copolymer is (1) a propylene-ethylene random copolymer having the content of propylene units of 90 to 99.5% by weight and the content of ethylene units of 0.5 to 10% by weight (the sum total of the contents of the propylene units and the ethylene units is taken as 100% by weight); (2) a propylene-ethylene-α-olefin random copolymer having the content of propylene units of 90 to 99% by weight, the content of ethylene units of 0.5 to 9.5% by weight, and the content of units of an α-olefin having 4 to 10 carbon atoms of 0.5 to 9.5% by weight (the sum total of the contents of the propylene units, the ethylene units, and the α-olefin units is taken as 100% by weight); or (3) a propylene-α-olefin random copolymer having the content of propylene units of 90 to 99.5% by weight and the content of units of an α-olefin having 4 to 10 carbon atoms of 0.5 to 10% by weight (the sum total of the contents of the propylene units and the α-olefin units is taken as 100% by weight).

The above-mentioned propylene-based block copolymer is a mixture composed of a first polymer and a second polymer produced by a production method composed of a step (1) of producing the first polymer which is a propylene homopolymer or a random copolymer having propylene units and ethylene units and/or α-olefin units, and a step (2) of producing, in the presence of the first polymer, the second polymer which is a random copolymer having propylene units and ethylene units and/or α-olefin units, wherein the content of monomer units other than propylene units contained in the second polymer (namely, the combined content of ethylene units and α-olefin units) is larger than the content of monomer units other than propylene units contained in the first polymer.

The block copolymer is preferably a polymer including the first polymer in which the content of monomer units other than propylene units is 0 to 10% by weight (the overall content of all the monomer units contained in the first polymer is taken as 100% by weight), more preferably a polymer including the second polymer in which the content of monomer units other than propylene units is 20 to 80% by weight (the overall content of all the monomer units contained in the second polymer is taken as 100% by weight), and even more preferably a polymer in which the content of the second polymer is 10 to 35% by weight (the quantity of the block copolymer is taken as 100% by weight).

Examples of the above-mentioned α-olefin having 4 to 10 carbon atoms include linear α-olefins such as 1-butene, 1-pentene, 1-hexene, 1-octene, and 1-decene; branched α-olefins such as 3-methyl-1-butene and 3-methyl-1-pentene; and combinations of two or more of them.

In order to improve processability, the melt flow rate (MFR) of the component (B) measured at 230° C. under a load of 21.18 N in accordance with JIS K7210 is 0.1 to 150 g/10 min, more preferably 0.1 to 100 g/10 min. Too much of the component (B) may cause deterioration in strength and compression set resistance, whereas too little of the component (B) may cause deterioration in processability.

Examples of the component (B) include propylene homopolymers, ethylene-propylene random copolymers, ethylene-propylene-butene random copolymers, ethylene-propylene block copolymers, and ethylene-propylene-butene block copolymers. Especially, propylene homopolymers, ethylene-propylene random copolymers, and ethylene-propylene block copolymers are preferred.

An example of the method for producing the propylene-based polymer of component (B) is a method comprising homopolymerizing propylene or copolymerizing propylene and other monomers by a conventional polymerization technique, such as slurry polymerization, solution polymerization, bulk polymerization, and vapor phase polymerization, using a conventional Ziegler-Natta catalyst or a conventional complex-based catalyst such as a metallocene type complex and a non-metallocene type complex.

(Mineral Oil-Based Softening Agent (C))

The mineral oil-based softening agent (C) is sometimes called component (C). Examples of the component (C) include high-boiling fractions of petroleum (with an average molecular weight of 300 to 1500 and a pour point of 0° C. or lower) such as aromatic mineral oil, naphthenic mineral oil, and paraffinic mineral oil. Among these, paraffinic mineral oil is preferred.

The component (C) may be blended as an extending oil of the component (A).

When the component (A) is an oil extended rubber, the content of the mineral oil-based softening agent in the component (A) is preferably 10 to 200 parts by weight, more preferably 20 to 150 parts by weight, and even more preferably 40 to 120 parts by weight, where the amount of the component (A) is taken as 100 parts by weight. Too much of the mineral oil-based softening agent may cause deterioration in strength, whereas too little of the mineral oil-based softening agent may cause deterioration in processability.

A conventional method is used as a method for blending the component (C) with the component (A). Examples of the method include a method comprising kneading the component (A) and the component (C) mechanically using a kneading apparatus such as a roll and a Banbury mixer, and a method comprising preparing a mixed liquid by adding a prescribed amount of the component (C) to a solution of the component (A), and then removing the solvent from the mixed liquid by a steam stripping method or the like.

In the present invention, in the production of the thermoplastic elastomer composition precursor, thermoplastic resin components other than the components (A) to (C) may optionally be added so long as they do not run counter to the object of the present invention. Examples of such additional components include olefin-based polymers other than the component (A) and the component (B), and ethylene-based polymers and the like are preferred.

The ethylene-based polymer to be used for the present invention is a polymer having monomer units derived from ethylene (ethylene units) in an amount of more than 90% by weight but not more than 100% by weight, where the overall amount of the monomers in the ethylene-based polymer is taken as 100% by weight.

Examples of the ethylene-based polymer include ethylene homopolymers and copolymers having one or more α-olefin units having 3 to 10 carbon atoms (e.g., propylene, 1-butene, 1-pentene, 4-methyl-1-pentene, and 1-hexene) and ethylene units. Preferred as the ethylene-based polymer are high density polyethylene, low density polyethylene, ethylene-propylene copolymers, ethylene-1-butene copolymers, ethylene-1-pentene copolymers, ethylene-4-methyl-1-pentene copolymers, and ethylene-1-hexene copolymers, and more preferred is high density polyethylene.

The melt flow rate (measured under a load of 21.18 N at a temperature of 190° C. in accordance with JIS K6760) of the ethylene-based polymer is preferably 0.01 to 300 g/10 min, more preferably 0.1 to 200 g/10 min.

The high density polyethylene to be used for the present invention is a polymer having monomer units derived from ethylene (ethylene units) in an amount of more than 90% by weight but not more than 100% by weight, where the weight of the polymer is taken as 100% by weight, the polymer having a density of 940 kg/m³ or more measured in accordance with JIS K7112.

The melt flow rates (measured at a temperature of 190° C. under a load of 21.18 N in accordance with JIS K6760) of the high density polyethylene is preferably 0.01 to 300 g/10 min, more preferably 0.1 to 200 g/10 min, even more preferably 0.5 to 50 g/10 min, and particularly preferably 1 to 10 g/10 min.

The high density polyethylene can be produced by conventional polymerization methods using a Ziegler-Natta catalyst, a metallocene catalyst, or the like as a polymerization catalyst. Examples of the polymerization method include a solution polymerization method, a bulk polymerization method, a slurry polymerization method, and a gas phase polymerization method, and these may be used in combination.

The thermoplastic elastomer composition precursor includes the component (A), the component (B), and the component (C). The thermoplastic elastomer composition precursor includes, where the total amount of the component (A), the component (B), and the component (C) is taken as 100% by weight, the component (A) in an amount of 10 to 75% by weight, preferably 20 to 60% by weight, and more preferably 30 to 50% by weight, the component (B) in an amount of 10 to 50% by weight, preferably 10 to 30% by weight, and more preferably 20 to 30% by weight, and the component (C) in an amount of 1 to 60% by weight, preferably 10 to 55% by weight, and more preferably 20 to 50% by weight.

Examples of the melt-kneading apparatus to be used for obtaining the thermoplastic elastomer composition precursor of the present invention include a mixing roll, which is of an open type, a Banbury mixer, an extruder, a kneader, and a continuous mixer, which are of a non-open type. Out of these, the use of a non-open type apparatus is preferred. In the melt-kneading, it is permitted to melt-knead at once all components to be kneaded, or it is permitted to knead some components and then add remaining components, followed by melt-kneading. The melt-kneading may be carried out either once or twice or more. The temperature in melt-kneading is usually 150 to 250° C., and the time is usually 1 to 30 minutes.

(Crosslinking Agent (D))

The crosslinking agent (D) is sometimes called component (D) in this description. Conventional crosslinking agents can be used as the component (D). Examples of the component (D) include organic peroxides, sulfur compounds, and alkylphenol resins. Especially, organic peroxides are preferred.

Examples of such organic peroxides include conventional ketone peroxides, diacyl peroxides, hydroperoxides, dialkyl peroxides, peroxyketals, alkyl peresters, percarbonates, peroxydicarbonates, and peroxyesters. Examples of specific organic peroxides include dicumyl peroxide, 2,5-dimethyl-2,5-di(tert-butylperoxy)hexane, 2,5-dimethyl-2,5-di(tert-butylperoxy)hexyne, 1,3-bis(tert-butylperoxyisopropyl)benzene, tert-butyl cumyl peroxide, di-tert-butyl peroxide, 2,2,4-trimethylpentyl-2-hydroperoxide, diisopropylbenzohydroperoxide, cumene peroxide, tert-butyl peroxide, 1,1-di(tert-butylperoxy)3,5,5-trimethylcyclohexane, 1,1-di-tert-butylperoxycyclohexane, isobutyl peroxide, 2,4-dichlorobenzoyl peroxide, o-methylbenzoyl peroxide, bis-3,5,5-trimethylhexanoyl peroxide, lauroyl peroxide, benzoyl peroxide, p-chlorobenzoyl peroxide; and combination of two or more of these organic peroxides.

The amount of the component (D) is 0.001 to 5 parts by weight, preferably 0.05 to 2 parts by weight, and more preferably 0.1 to 1 part by weight, relative to 100 parts by weight of the thermoplastic elastomer composition precursor. Too much of the component (D) may cause deterioration in processability, whereas too little of the component (D) may cause deterioration in mechanical strength.

In order to improve the degree of crosslinking of the thermoplastic elastomer composition to be produced, the component (D) may be combined with a crosslinking aid. Preferable crosslinking aids are compounds having two or more double bonds. Examples of the crosslinking aid include peroxide crosslinking aids, such as N,N-m-phenylenebismaleimide, toluylene bismaleimide, p-quinonedioxime, nitrosobenzene, diphenylguanidine, and trimethylolpropane; polyfunctional vinyl monomers, such as divinylbenzene and triallyl cyanurate, triallyl isocyanurate, ethylene glycol dimethacrylate, polyethylene glycol dimethacrylate, trimethylolpropane trimethacrylate, and allyl methacrylate. Especially, trimethylolpropane trimethacrylate is preferred.

The amount of the crosslinking aid is 0.01 to 10 parts by weight and preferably 0.01 to 5 parts by weight, where the amount of the thermoplastic elastomer composition precursor is taken as 100 parts by weight.

The method of the present invention comprises a step of preparing a thermoplastic elastomer composition by dynamically vulcanizing a thermoplastic elastomer composition precursor comprising the component (A), the component (B), the component (C), and optionally other components, in the presence of the component (D). The "dynamic vulcanization" in the present invention means the treatment of melt-kneading a thermoplastic elastomer composition precursor comprising the component (A), the component (B), the component (C), and optionally other components, in the presence of the component (D) under shearing force.

Examples of the melt-kneading apparatus to be used for obtaining the thermoplastic elastomer composition of the present invention include a mixing roll, which is of an open type, a Banbury mixer, an extruder, a kneader, and a continuous mixer, which are of a non-open type. Out of these, the use of a non-open type apparatus is preferred. In the melt-kneading, it is permitted to melt-knead at once all components to be kneaded, or it is permitted to knead some components and then add remaining components, followed by melt-kneading. The melt-kneading may be carried out either once or twice or more. The temperature in melt-kneading is usually 150 to 250° C., and the time is usually 1 to 30 minutes.

(Halogen-Free Flame Retardant (E))

The halogen-free flame retardant (E) is sometimes called component (E) in this description. As the component (E), there can be used a halogen-free flame retardant which is commonly used as a flame retardant for polyolefin. Specific examples thereof include hydrated metal compounds such as aluminum hydroxide, magnesium hydroxide and calcium aluminate; organophosphate compounds such as triphenyl phosphate, tricresyl phosphate, bisphenol A-bisdiphenyl phosphate and resorcinol-bisdiphenyl phosphate; phosphate compounds such as ammonium polyphosphate, melamine polyphosphate, piperazine polyphosphate, piperazine orthophosphate, melamine pyrophosphate, piperazine pyrophosphate, melamine polyphosphate, melamine orthophosphate, calcium phosphate and magnesium phosphate; or mixtures thereof. Out of these, phosphate compounds are preferred.

There can likewise be used compounds named by replacing the term "melamine" or "piperazine" in the above examples of the phosphate compound by N,N,N',N'-tetramethyldiaminomethane, ethylenediamine, N,N'-dimethylethylenediamine, N,N'-diethylethylenediamine, N,N-dimethylethylenediamine, N,N-diethylethylenediamine, N,N,N',N'-tetramethylethylenediamine, N,N,N',N'-diethylethylenediamine, 1,2-propanediamine, 1,3-propanediamine, tetramethylenediamine, pentamethylenediamine, hexamethylenediamine, 1,7-diaminoheptane, 1,8-diaminooctane, 1,9-diaminononane, 1,10-diaminodecane, trans-2,5-dimethylpiperazine, 1,4-bis(2-aminoethyl)piperazine, 1,4-bis(3-aminopropyl)piperazine, acetoguanamine, acrylic guanamine, 2,4-diamino-6-nonyl-1,3,5-triazine, 2,4-diamino-6-hydroxy-1,3,5-triazine, 2-amino-4,6-dihydroxy-1,3,5-triazine, 2,4-diamino-6-methoxy-1,3,5-triazine, 2,4-diamino-6-ethoxy-1,3,5-triazine, 2,4-diamino-6-propoxy-1,3,5-triazine, 2,4-diamino-6-isopropoxy-1,3,5-triazine, 2,4-diamino-6-mercapto-1,3,5-triazine, 2-amino-4,6-dimercapto-1,3,5-triazine, ammeline, acetoguanamine, phthalodiguanamine, melamine cyanurate, melamine pyrophosphate, butylenediguanamine, norbornenediguanamine, methylenediguanamine, ethylenedimelamine, trimethylenedimelamine, tetramethylenedimelamine, hexamethylenedimelamine, 1,3-hexylenedimelamine, etc.

(Zinc Oxide (F))

The zinc oxide (F) is sometimes called component (F) in this description.

The component (F) may have been surface treated. Examples of the component (F) include commercially available products such as zinc oxide Type II produced by Seido Chemical Industry Co., Ltd., zinc oxide Type I produced by Mitsui Mining & Smelting Co., Ltd., partially coated type zinc oxide produced by Mitsui Mining & Smelting Co., Ltd., NANO FINE 50 (ultrafine particle zinc oxide with an average particle diameter of 0.02 μm, produced by Sakai Chemical Industry Co., Ltd.), and NANO FINE K (ultrafine particle zinc oxide coated with zinc silicate having an average particle diameter of 0.02 μm, produced by Sakai Chemical Industry Co., Ltd.).

(Mixture of Halogen-Free Flame Retardant and Zinc Oxide)

A mixture in which a halogen-free flame retardant and zinc oxide have been mixed beforehand may be used as the component (E) and the component (F). Preferred as the mixture of a halogen-free flame retardant and zinc oxide is a mixture of a phosphate and zinc oxide, and specific examples thereof include "ADK STAB FP-2200" produced by ADEKA Corporation and "ADK STAB FP-2200S" produced by ADEKA Corporation.

One embodiment of the present invention has a step of kneading the thermoplastic elastomer composition, the halogen-free flame retardant (E), and the zinc oxide (F). The combined amount of the component (E) and the component (F) is 30 to 70 parts by weight, preferably 30 to 60 parts by weight, and more preferably 30 to 50 parts by weight, where the amount of the thermoplastic elastomer composition precursor used in the production of the thermoplastic elastomer composition is taken as 100 parts by weight. Too much of the component (E) or the component (F) may cause deterioration in processability, whereas too little of the component (E) or the component (F) may cause deterioration in flame retardancy.

(Polyhydric Compound (G))

The polyhydric compound (G) is sometimes called component (G) in this description. Examples of the component (G) include pentaerythritol, dipentaerythritol, tripentaerythritol, polypentaerythritol (degree of condensation≥4), trishydroxyethyl isocyanate, polyethylene glycol, glycerol, starch, grape sugar, cellulose, and sorbitol. Out of these polyhydric compounds, polyhydric alcohol compounds are preferable in terms of high affinity to resin, low solubility in water, and low moisture absorption, and pentaerythritol, dipentaerythritol, tripentaerythritol, and polypentaerythritol are more preferred, and pentaerythritol is especially preferred because of their particularly low solubility in water and particularly low moisture absorption.

Another embodiment of the present invention has a step of kneading the thermoplastic elastomer composition, the halogen-free flame retardant (E), the zinc oxide (F), and the polyhydric compound (G). The amount of the component (E) and the component (F) is the same as in the above-described embodiment. The amount of the component (G) is preferably 0.5 to 10 parts by weight, more preferably 1 to 10 parts by weight, and even more preferably 1 to 5 parts by weight, relative to 100 parts by weight of the thermoplastic elastomer composition precursor used in the production of the thermoplastic elastomer composition. Too much of the component (G) may cause deterioration in the appearance or the mechanical performance of molded articles, whereas too little of the component (G) may cause deterioration in flame retardancy.

In the present invention, other additional components may optionally be added in addition to the aforementioned components (A) through (G) so long as they do not run counter to the object of the present invention. Examples of such additional components include additives such as inorganic fillers (e.g., talc, calcium carbonate, and calcined kaolin), organic fillers (e.g., fiber, wood flour, and cellulose powder), antioxidants (e.g., phenol-based, sulfur-based, phosphorus-based, lactone-based, and vitamin-based antioxidants), weathering stabilizers, UV absorbers (e.g., benzotriazole-based, tridiamine-based, anilide-based, and benzophenone-based UV absorbers), heat stabilizers, light stabilizers (e.g., hindered amine light stabilizers and benzoate type light stabilizers), antistatic agents, nucleating agents, pigments, adsorbents (e.g., metal oxides), metal chlorides (e.g., ferric chloride and calcium chloride), hydrotalcite, aluminates, lubricants (e.g., fatty acids, higher alcohols, aliphatic amides, and aliphatic esters) and silicone compounds. Such additives may be blended in advance into the components (A), (B), (C), (D), (F), and (G), followed by the preparation of a flame retardant thermoplastic elastomer composition, or they may be blended after or during the melt-kneading of the components (A), (B), (C), (D), (E), (F), and (G).

The Shore A durometer hardness (measured in accordance with JIS K6253) of a flame retardant thermoplastic elastomer composition obtained using the method of the present invention is preferably 60 to 95, more preferably 60 to 90, and even more preferably 65 to 85.

Examples of the melt-kneading apparatus to be used for obtaining the flame retardant thermoplastic elastomer composition of the present invention include a mixing roll, which is of an open type, a Banbury mixer, an extruder, a kneader, and a continuous mixer, which are of a non-open type. Out of these, the use of a non-open type apparatus is preferred. In the melt-kneading, it is permitted to melt-knead at once all components to be kneaded, or it is permitted to knead some components and then add remaining components, followed by melt-kneading. The melt-kneading may be carried out either once or twice or more. The temperature in melt-kneading is usually 150 to 250° C., and the time is usually 1 to 30 minutes.

A preferred method for producing the flame retardant thermoplastic elastomer composition of the present invention preferred in terms of tensile characteristics and compression set, includes a method comprising a first kneading step of melt-kneading the component (A), the component (B), and the component (C), thereby producing a thermoplastic elastomer composition precursor, a second kneading step of dynamically vulcanizing the thermoplastic elastomer composition precursor in the presence of the component (D), thereby producing a thermoplastic elastomer composition, and a third kneading step of melt-kneading the thermoplastic elastomer composition, the component (E), the component (F), and optionally the component (G), thereby producing a flame retardant thermoplastic elastomer composition.

Flame retardant thermoplastic elastomer compositions obtained using the method of the present invention are shaped into various molded articles by extrusion process, calendering, or injection molding using an apparatus in use for the shaping of common thermoplastic resins.

Molded articles of a flame retardant thermoplastic elastomer composition obtained using the method of the present invention are used for various applications such as automotive interior parts such as a console box and an instrument panel surface material, and automotive exterior parts such as a window mall, various electrical machinery parts, various household appliance parts such as housing materials and toys, various packaging members, various agricultural materials, and various building members.

EXAMPLES

The present invention is hereafter further explained on the basis of Examples, but the invention is not limited to the Examples.

Methods for Measuring Physical Properties (1) Mooney Viscosity ($ML_{1+4}100°$ C.)

Measurement was conducted in accordance with JIS K6300.

(2) Melt Flow Rate (MFR)

Measurement was conducted in accordance with JIS K7210. Measurement was conducted at a temperature of 230° C. and a load of 98.07 N for flame retardant thermoplastic elastomer compositions, at a temperature of 230° C. and a load of 21.18 N for propylene-based polymers, and at a temperature of 190° C. and a load of 21.18 N for ethylene-based polymers.

(3) Contents of Ethylene Units, Propylene Units, and 5-Ethylidene-2-Norbornene Units Measurement was conducted by infrared spectroscopy.

(4) Hardness

Shore A durometer hardness was measured in accordance with JIS K6253.

(5) Compression Set

Measurement was conducted in accordance with JIS K6262 under conditions including 70° C., 25% compression, and 22 hours.

(6) Strength at Break and Elongation at Break

Measurement was conducted using a JIS No. 3 specimen under conditions including a tensile rate of 200 mm/min in accordance with JIS K6251, and thereby a tensile strength and an elongation at break were measured.

(7) Flame Retardancy Test

A specimen being 127 mm in length, 12.7 mm in width, and 1.5 mm in thickness was kept vertical, then a fire of burner was brought to the bottom end of the specimen closely for 10 seconds and the burner was taken away. The length of time taken until the fire of the specimen went out was measured. As soon as the fire went out, the fire of burner was again brought to the bottom end of the specimen closely for 10 seconds. The length of time taken until the fire of the specimen went out was measured in the same way as the first time. In addition, it was simultaneously evaluated whether the cotton placed under the specimen began to burn or not due to the dropping of live charcoal on it. From the viewpoints of how long the specimen kept burning and whether the cotton began to burn or not in the first and second tests, the burning-rank was set according to the UL-94V standard. The burning rank corresponding to V-0 was represented by ⊙, the rank corresponding to V-1 was represented by ○, and the rank corresponding to V-2 was represented by Δ. V-2 represents the worst flame retardancy and V-0 represents the best flame redardency. The case that does not correspond to any rank of V-0 to V-2 was represented by x.

Materials used in the Examples are as follows.

<Oil-Extended Ethylene-α-Olefin-Based Copolymer Rubber (A1/C1)>

Oil extended rubber prepared by adding (C1) 100 parts by weight of paraffinic mineral oil to (A1) 100 parts by weight of ethylene-propylene-5-ethylidene-2-norbornene copolymer rubber. (A1) had the content of ethylene units of 66% by weight, the content of propylene units of 30% by weight, and the content of 5-ethylidene-2-norbornene units of 4% by weight and had an intrinsic viscosity of 4.5 dl/g. The oil-extended ethylene-α-olefin-based copolymer rubber (A1/C1) had a Mooney viscosity ($ML_{1+4}$ 100° C.) of 63.

<Component (B) Propylene-Based Polymer>

(B1) Propylene homopolymer (MFR (230° C., 21.18 N)=15 g/10 min)

<Component (D) Crosslinking Agent>

(D1) Commercial name "APO-10DL" produced by Kayaku Akzo Corporation (2,5-dimethyl-2,5-di(tert-butylperoxy)hexane diluted with paraffinic oil (commercial name "PW-100" produced by Idemitsu Kosan, Inc.) in a 10% concentration)

<Component (E) Halogen-Free Flame Retardant>

(E1) Product with the commercial name "ADK STAB FP-2100J" produced by ADEKA Corporation. (phosphate)

<Component (F) Zinc Oxide>

(F1) Product with the commercial name "Zinc oxide Type II" produced by Seido Chemical Industry Co., Ltd.

<Mixture of Halogen-Free Flame Retardant and Zinc Oxide>

(E2/F1) Product with the commercial name "ADK STAB FP-2200" produced by ADEKA Corporation. (a mixture of a phosphate and zinc oxide)

(E3/F1) Product with the commercial name "ADK STAB FP-2000S" produced by ADEKA Corporation. (a mixture of a phosphate and zinc oxide)

<Component (G) Polyhydric Compound>

(G1) Product with the commercial name "Pentarit" produced by Koei Chemical Co., Ltd. (pentaerythritol)

(G2) Product with the commercial name "Di-Pentarit" produced by Koei Chemical Co., Ltd. (dipentaerythritol)

Example 1

Production of Flame Retardant Thermoplastic Elastomer Composition

A thermoplastic elastomer composition precursor was obtained by kneading at 200±10° C. using a twin screw extruder 87.4% by weight of an oil-extended ethylene-α-olefin-based copolymer rubber (A1/C1), 12.6% by weight of a propylene-based polymer (B1), and high density polyethylene (commercial name "HI-ZEX 1300J" produced by Prime Polymer Co., Ltd. (density=961 kg/m³, MFR=13 g/10 min)) in an amount of 2.9 parts by weight per 100 parts by weight of the oil-extended ethylene-α-olefin-based copolymer rubber (A1/C1) and the propylene-based polymer (B1) in total.

Next, a thermoplastic elastomer composition was obtained by kneading (in other words, dynamically vulcanizing) at 200±10° C. using a twin screw extruder 100 parts by weight of the resulting thermoplastic elastomer composition precursor, 3.2 parts by weight of a crosslinking agent (D1), 0.3 parts by weight of a crosslinking aid (trimethylolpropane trimethacrylate (commercial name "Hi-Cross M-P" produced by Seiko Chemical Co., Ltd.)), 0.1 parts by weight of an antioxidant (commercial name "SUMILIZER GA80" produced by Sumitomo Chemical Co., Ltd.), 0.2 parts by weight of a diazo type weathering stabilizer (commercial name "SUMISORB 300" by Sumitomo Chemical Co., Ltd.), and 0.2 parts by weight of a HALS type weathering stabilizer (commercial name "TINUVIN 622" produced by Ciba Specialty Chemicals).

Then, a flame retardant thermoplastic elastomer composition was produced by kneading 104 parts by weight of the resulting thermoplastic elastomer composition and 69.3 parts by weight of a halogen-free flame retardant (E2/F1) at 200±10° C. using a twin screw extruder. In other words, the amount of the halogen-free flame retardant (E2/F1) used was 69.3 parts by weight per 100 parts by weight of the thermoplastic elastomer composition precursor used for the production of the thermoplastic elastomer composition. The results of the measurement of physical properties of the resulting flame retardant thermoplastic elastomer composition are shown in Table 1.

Example 2

Production of Flame Retardant Thermoplastic Elastomer Composition

Operations were conducted in the same manner as Example 1 except for adding 56.0 parts by weight of a halogen-free flame retardant (E3/F1) instead of the halogen-free flame retardant (E2/F1). The results of physical properties measurement are shown in Table 1.

Example 3

Production of Flame Retardant Thermoplastic Elastomer Composition

Operations were conducted in the same manner as Example 1 except for changing the amount of the halogen-free flame retardant (E2/F1) to 44.6 parts by weight and further adding 2.7 parts by weight of a polyhydric compound (G1) into the thermoplastic elastomer composition. The results of physical properties measurement are shown in Table 1.

(Production of Flame Retardant Thermoplastic Elastomer composition)

Operations were conducted in the same manner as Example 3 except for changing the loading of the polyhydric compound (G1) to 6.9 parts by weight. The results of physical properties measurement are shown in Table 1.

Example 5

Production of Flame Retardant Thermoplastic Elastomer Composition

Operations were conducted in the same manner as Example 2 except for changing the amount of the halogen-free flame retardant (E3/F1) to 34.7 parts by weight and further adding 1.4 parts by weight of a polyhydric compound (G1) into the thermoplastic elastomer composition. The results of physical properties measurement are shown in Table 1.

Example 6

Production of Flame Retardant Thermoplastic Elastomer Composition

Operations were conducted in the same manner as Example 5 except for incorporating 1.7 parts by weight of a polyhydric compound (G2) instead of 1.4 parts by weight of the polyhydric compound (G1), and further adding 1.4 parts by weight of zinc oxide (F1). The results of physical properties measurement are shown in Table 1.

Comparative Example 1

Production of Thermoplastic Elastomer Composition 87.4% by weight of an oil-extended ethylene-α-olefin-based copolymer rubber (A1/C1), 12.6% by weight of a propylene-based polymer (B1), and high density polyethylene (commercial name "HI-ZEX 1300)") in an amount of 2.9 parts by weight per 100 parts by weight of the oil-extended ethylene-α-olefin-based copolymer rubber (A1/C1) and the propylene-based polymer (B1) in total were mixed. A thermoplastic elastomer composition was obtained by mixing 100 parts by weight of the resulting mixture, 3.2 parts by weight of a crosslinking agent (D1), 0.3 parts by weight of a crosslinking aid (commercial name "Hi-Cross M-P"), 0.1 parts by weight of an antioxidant (commercial name "SUMILIZER GA80"), 0.2 parts by weight of a diazo type weathering stabilizer (commercial name "SUMISORB 300"), and 0.2 parts by weight of a HALS type weathering stabilizer (commercial name "TINUVIN 622"), and then kneading (dynamically vulcanizing) the mixture at 200±10° C. using a twin screw extruder. The results of physical properties measurement are shown in Table 1.

Comparative Example 2

Production of Flame-Retardant Thermoplastic Elastomer Composition

Operations were conducted in the same manner as Example 1 except for adding 69.3 parts by weight of a halogen-free flame retardant (E1) instead of the halogen-free flame retardant (E2/F1). The results of physical properties measurement are shown in Table 1.

Comparative Example 3

Production of Flame Retardant Thermoplastic Elastomer Composition

Operations were conducted in the same manner as Comparative Example 2 except for changing the amount of the halogen-free flame retardant (E1) to 56.0 parts by weight. The results of physical properties measurement are shown in Table 1.

Comparative Example 4

Production of Flame Retardant Thermoplastic Elastomer Composition 87.4% by weight of an oil-extended ethylene-α-olefin-based copolymer rubber (A1/C1), 12.6% by weight of a propylene-based polymer (B1), and high density polyethylene (commercial name "HI-ZEX 1300)") in an amount of 2.9 parts by weight per 100 parts by weight of the oil-extended ethylene-α-olefin-based copolymer rubber (A1/C1) and the propylene-based polymer (B1) in total were mixed. A flame retardant thermoplastic elastomer composition was obtained by mixing 100 parts by weight of the resulting mixture, 3.2 parts by weight of a crosslinking agent (D1), 69.3 parts by weight of a halogen-free flame retardant (E2/F1), 0.3 parts by weight of a crosslinking aid (commercial name "Hi-Cross M-P"), 0.1 parts by weight of an antioxidant (commercial name "SUMILIZER GA80"), 0.2 parts by weight of a diazo type weathering stabilizer (commercial name "SUMISORB 300"), and 0.2 parts by weight of a HALS type weathering stabilizer (commercial name "TINUVIN 622"), and then kneading (dynamically vulcanizing) the mixture at 200±10° C. using a twin screw extruder. The results of physical properties measurement are shown in Table 1.

Comparative Example 5

Production of Flame-Retardant Thermoplastic Elastomer Composition

Operations were conducted in the same manner as Comparative Example 4 except for changing the loading of the halogen-free flame retardant (E2/F1) to 104 parts by weight. The results of physical properties measurement are shown in Table 1.

TABLE 1

|  |  |  | Example 1 | Example 2 | Example 3 | Example 4 | Example 5 | Example 6 |
|---|---|---|---|---|---|---|---|---|
| Compounding Formulation | (A1) | (% by weight) | 43.7 | 43.7 | 43.7 | 43.7 | 43.7 | 43.7 |
|  | (B1) | (% by weight) | 12.6 | 12.6 | 12.6 | 12.6 | 12.6 | 12.6 |
|  | (C1) | (% by weight) | 43.7 | 43.7 | 43.7 | 43.7 | 43.7 | 43.7 |
|  | HI-ZEX 1300J | (parts by weight) | 2.9 | 2.9 | 2.9 | 2.9 | 2.9 | 2.9 |
|  | Thermoplastic elastomer composition precursor | (parts by weight) | 100 | 100 | 100 | 100 | 100 | 100 |
|  | (D1) | (parts by weight) | 3.2 | 3.2 | 3.2 | 3.2 | 3.2 | 3.2 |
|  | (E1) | (parts by weight) |  |  |  |  |  |  |
|  | (E2 + F1) | (parts by weight) | 69.3 |  | 44.6 | 44.6 |  |  |
|  | (E3 + F1) | (parts by weight) |  | 56.0 |  |  | 34.7 | 34.7 |
|  | (F1) | (parts by weight) |  |  |  |  |  | 1.4 |
|  | (G1) | (parts by weight) |  |  | 2.7 | 6.9 | 1.4 |  |
|  | (G2) | (parts by weight) |  |  |  |  |  | 1.7 |

TABLE 1-continued

| Properties Evaluation | Burning Text | — | ☉ | ☉ | ☉ | ☉ | ☉ | ☉ |
|---|---|---|---|---|---|---|---|---|
| | MFR | g/10 min | 7 | 10 | 60 | 65 | 19 | 28 |
| | Hardness | — | 77 | 79 | 78 | 77 | 76 | 76 |
| | Strength at break | MPa | 3.1 | 3.0 | 3.2 | 2.3 | 5.1 | 4.6 |
| | Elongation at break | % | 360 | 500 | 480 | 350 | 670 | 600 |
| | Compression set | % | 42 | 48 | 43 | 51 | 48 | 49 |

| | | | Comparative Example 1 | Comparative Example 2 | Comparative Example 3 | Comparative Example 4 | Comparative Example 5 |
|---|---|---|---|---|---|---|---|
| Compounding Formulation | (A1) | (% by weight) | 43.7 | 43.7 | 43.7 | 43.7 | 43.7 |
| | (B1) | (% by weight) | 12.6 | 12.6 | 12.6 | 12.6 | 12.6 |
| | (C1) | (% by weight) | 43.7 | 43.7 | 43.7 | 43.7 | 43.7 |
| | HI-ZEX 1300J | (parts by weight) | 2.9 | 2.9 | 2.9 | 2.9 | 2.9 |
| | Thermoplastic elastomer composition precursor | (parts by weight) | 100 | 100 | 100 | 100 | 100 |
| | (D1) | (parts by weight) | 3.2 | 3.2 | 3.2 | 3.2 | 3.2 |
| | (E1) | (parts by weight) | | 69.3 | 56.0 | | |
| | (E2 + F1) | (parts by weight) | | | | 69.3 | 104.0 |
| | (E3 + F1) | (parts by weight) | | | | | |
| | (F1) | (parts by weight) | | | | | |
| | (G1) | (parts by weight) | | | | | |
| | (G2) | (parts by weight) | | | | | |
| Properties Evaluation | Burning Text | — | X | ○ | X | ☉ | ☉ |
| | MFR | g/10 min | 30 | 4 | 11 | 4 | 3 |
| | Hardness | — | 60 | 78 | 74 | 75 | 80 |
| | Strength at break | MPa | 4.6 | 2.7 | 3.0 | 3.1 | 2.8 |
| | Elongation at break | % | 580 | 430 | 471 | 230 | 160 |
| | Compression set | % | 35 | 44 | 39 | 64 | 60 |

The invention claimed is:

1. A method for producing a flame retardant thermoplastic elastomer composition, wherein the method comprises a step of preparing a thermoplastic elastomer composition by dynamically vulcanizing a thermoplastic elastomer composition precursor comprising 10 to 75% by weight of (A) an ethylene-α-olefin-based copolymer rubber, 10 to 50% by weight of (B) a propylene-based polymer and 1 to 60% by weight of (C) a mineral oil-based softening agent in the presence of 0.001 to 5 parts by weight of (D) a crosslinking agent per 100 parts by weight of the thermoplastic elastomer composition precursor, where the total amount of the ethylene-α-olefin-based copolymer rubber (A), the propylene-based polymer (B) and the mineral oil-based softening agent (C) is taken as 100% by weight, and a step of kneading the thermoplastic elastomer composition, (E) a halogen-free flame retardant, (F) a zinc oxide and (G) a polyhydric compound where the combined amount of the halogen-free flame retardant (E) and the zinc oxide (F) is 30 to 70 parts by weight and the amount of the polyhydric compound (G) is 0.5 to 10 parts by weight per 100 parts by weight of the thermoplastic elastomer composition precursor.

2. The method according to claim 1, wherein the polyhydric compound (G) is selected from the group consisting of pentaerythritol, dipentaerythritol, tripentaerythritol and polypentaerythritol.

3. The method according to claim 1, wherein the halogen-free flame retardant (E) is a phosphate-based flame retardant.

4. The method according to claim 1, wherein the flame retardant thermoplastic elastomer composition produced by the method has a Shore A durometer hardness of 60 to 95.

* * * * *